US010358607B2

(12) United States Patent
Riihimaeki et al.

(10) Patent No.: US 10,358,607 B2
(45) Date of Patent: Jul. 23, 2019

(54) FILTER AND FILTERING ARRANGEMENT

(71) Applicant: Valmet Technologies Oy, Espoo (FI)

(72) Inventors: Teppo Riihimaeki, Linnavuori (FI); Antti Kaura, Tampere (FI); Lauri Kokko, Tampere (FI); Joakim Autio, Kangasala (FI)

(73) Assignee: Valmet Technologies Oy, Espoo (FI)

( * ) Notice: Subject to any disclaimer, the term of this patent is extended or adjusted under 35 U.S.C. 154(b) by 34 days.

(21) Appl. No.: 15/378,837

(22) Filed: Dec. 14, 2016

(65) Prior Publication Data
US 2017/0183572 A1   Jun. 29, 2017

(30) Foreign Application Priority Data

Dec. 29, 2015   (FI) ...................................... 20156019

(51) Int. Cl.
*C10G 31/09* (2006.01)
*B01D 29/00* (2006.01)
(Continued)

(52) U.S. Cl.
CPC ......... *C10G 31/09* (2013.01); *B01D 29/0095* (2013.01); *B01D 29/0097* (2013.01);
(Continued)

(58) Field of Classification Search
CPC .............. C10G 31/09; C10G 2300/208; B01D 29/118; B01D 29/0095; B01D 29/117;
(Continued)

(56) References Cited

U.S. PATENT DOCUMENTS 2,757,800 A    8/1956   Kucera
3,666,828 A *  5/1972   Post ....................... B01D 17/02
                                                          585/652
(Continued)

FOREIGN PATENT DOCUMENTS

CN   204400915 U   6/2015
DE      823821 C1  12/1951
(Continued)

OTHER PUBLICATIONS

European Patent Office, Search Report for Application No. 16204989.4, dated May 10, 2017, Germany.
(Continued)

*Primary Examiner* — Madeline Gonzalez
(74) *Attorney, Agent, or Firm* — Alston & Bird LLP

(57) ABSTRACT

A filter for filtering pyrolysis oil and an arrangement. The filter is a split-flow filter (1, 1*a*, 1*b*), comprising a filter element (12), comprising plurality of apertures (17) extending through the filter element (12), a receiving channel (13) for receiving a flow (F) of pyrolysis oil to be filtered and for supplying said flow on first side (A) of the filter element (12), a main discharge channel (14) arranged on the first side (A) of the filter element (12) for discharging the portion of the flow (F) of pyrolysis oil having not penetrated through the filter element (12), and a filtrate channel (15) arranged on second side (B) of the filter element (12) for discharging the portion of the flow (F) of pyrolysis oil having penetrated through the filter element (12).

30 Claims, 6 Drawing Sheets

Figure 1:
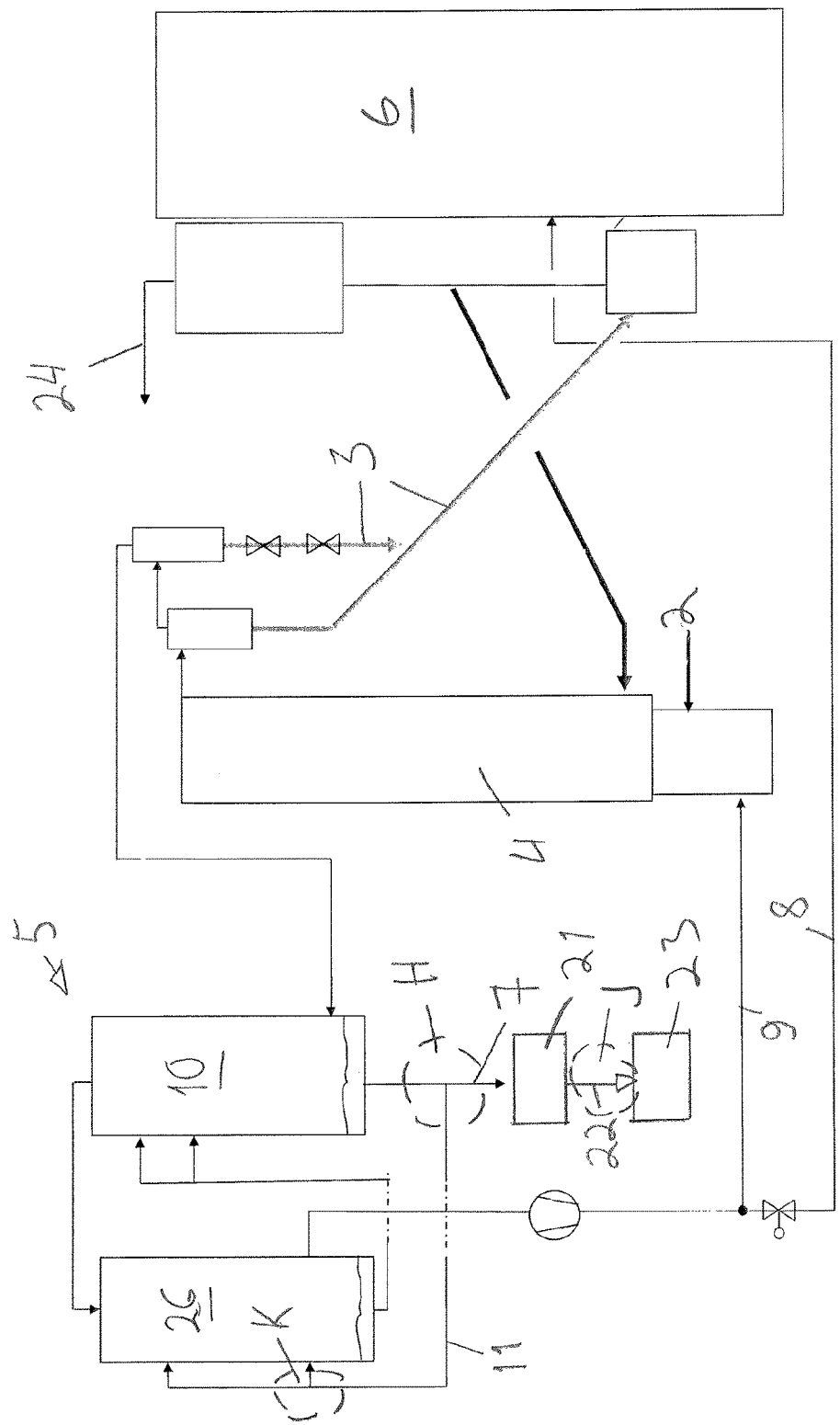

(51) Int. Cl.
*B01D 29/56* (2006.01)
*B01D 29/11* (2006.01)

(52) U.S. Cl.
CPC .......... *B01D 29/114* (2013.01); *B01D 29/117* (2013.01); *B01D 29/118* (2013.01); *B01D 29/56* (2013.01); *B01D 2201/184* (2013.01); *C10G 2300/208* (2013.01)

(58) Field of Classification Search
CPC .. B01D 29/114; B01D 29/56; B01D 29/0097; B01D 2201/184
USPC ...................... 210/433.1, 194, 248, 439, 446
See application file for complete search history.

(56) References Cited

U.S. PATENT DOCUMENTS

| | | | |
|---|---|---|---|
| 3,947,314 | A | 3/1976 | Chupka et al. |
| 4,753,737 | A | 6/1988 | Staples et al. |
| 5,167,807 | A * | 12/1992 | Peterson ................ A01J 25/112 210/195.1 |

| | | | |
|---|---|---|---|
| 2005/0218062 | A1 | 10/2005 | Forman |
| 2010/0078371 | A1 | 4/2010 | Saito |
| 2012/0211410 | A1 | 8/2012 | Wnuk et al. |
| 2012/0317871 | A1 | 12/2012 | Frey et al. |

FOREIGN PATENT DOCUMENTS

| | | |
|---|---|---|
| EP | 2138218 A1 | 9/2008 |
| JP | H09279158 A | 10/1997 |

OTHER PUBLICATIONS

National Board of Patents and Registration of Finland, Search Report for Application No. 20156019, dated Jun. 6, 2016, 2 pages, Finland.
National Board of Patents and Registration of Finland, Office Action for Application No. 20156019, dated Oct. 1, 2018, 7 pages, Finland.
Prudich, M. E., et al., "Membrane Separation Processes", In: D. W. Green and R. H. Perry, eds., Perry's Chemical Engineers' Handbook, 8$^{th}$ Edition, 2008, pp. 20-36-20-45, McGraw-Hill, New York.

* cited by examiner

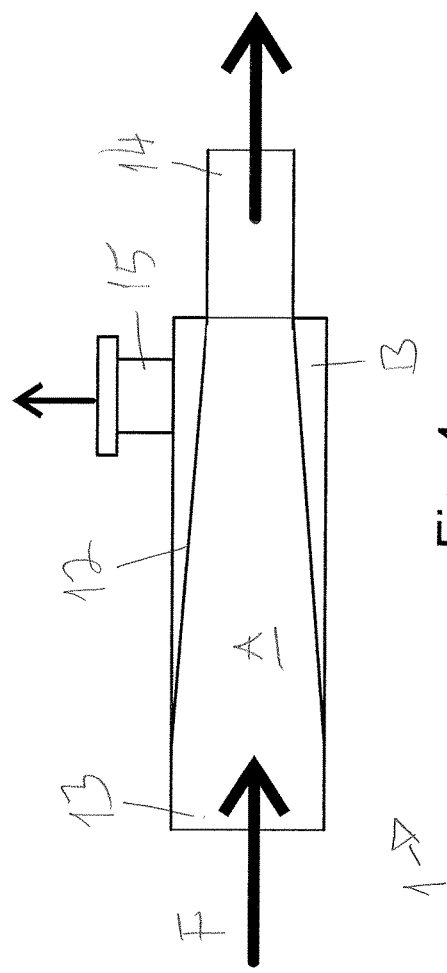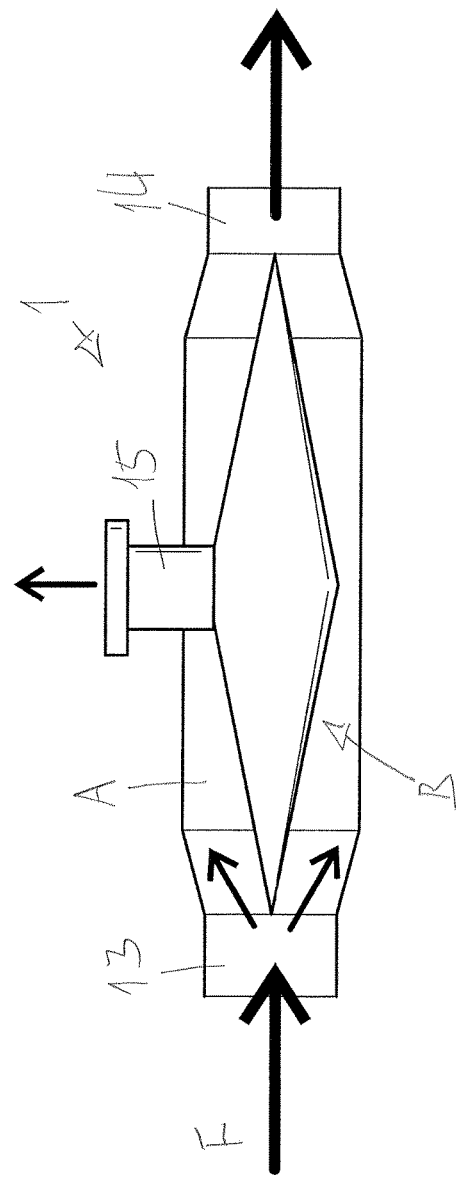
Fig. 4
Fig. 5

FILTER AND FILTERING ARRANGEMENT

CROSS-REFERENCE TO RELATED APPLICATIONS

This application claims priority to and full benefit of Finnish Patent Application No. 20156019, filed Dec. 29, 2015; the entire disclosure of which as is hereby incorporated by reference herein.

BACKGROUND

The invention relates to a filter for filtering pyrolysis oil.

The invention further relates to a filtering arrangement for filtering pyrolysis oil.

In this text pyrolysis means converting fuel in inert conditions and in high temperature into gaseous state, which forms an oil-like, different organic compounds comprising liquid as it condensed. Inert conditions mean oxygen-free conditions where no combustion of the fuel occurs.

In the pyrolysis process fuel is pyrolyzed, and formed gaseous compounds, i.e. pyrolysis gases are separated from the char residue and the pyrolysis gases are condensed into pyrolysis oil.

Pyrolysis oil may be used as fuel or refined into different chemicals. Production of pyrolysis oil from different kinds of biomass, for example from wood fuels, is studied for replacing coal and heavy fuel oil.

A challenge with the pyrolysis process is that pyrolysis oil may comprise not only liquid components but also solid matter, e.g. bed material originating from pyrolysis reactor, coke particles formed in the process, raw material of the pyrolysis process etc., and liquid components having high viscosity. These components may cause problems e.g. in end use of pyrolysis oil by blocking oil-burners' nozzles etc.

BRIEF SUMMARY

Viewed from a first aspect, there can be provided a filter for filtering pyrolysis oil, the filter being a split-flow filter, comprising a filter element, comprising plurality of apertures extending through the filter element, a receiving channel for receiving a flow of pyrolysis oil to be filtered and for supplying said flow on first side of the filter element, a main discharge channel arranged on the first side of the filter element for discharging the portion of the flow of pyrolysis oil having not penetrated through the filter element, and a filtrate channel arranged on second side of the filter element for discharging the portion of the flow of pyrolysis oil having penetrated through the filter element.

Thereby a filter for filtering solid matter and/or highly viscose phases in pyrolysis oil in an effective way may be achieved.

Viewed from a further aspect, there can be provided a filtering arrangement for filtering pyrolysis oil, comprising the filter as defined above, wherein the receiving channel and the main discharge channel are connected to a circulation conduit that is connected to a condenser unit for cooling pyrolysis gas therein.

Thereby a filtering arrangement for filtering solid matter and/or highly viscose phases in pyrolysis plant in an effective way may be achieved.

Viewed from a further aspect, there can be provided a filtering arrangement for filtering pyrolysis oil, comprising the filter as defined above, wherein the receiving channel and the main discharge channel are connected to an outlet conduit being arranged for transferring pyrolysis oil out form a pyrolysis plant for use or to transporting means.

Thereby a filtering arrangement for filtering solid matter and/or highly viscose phases out of pyrolysis oil transferred to transporting means in an effective way may be achieved.

The filter and the arrangement are characterised by what is stated in the characterising parts of the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF THE SEVERAL VIEWS OF THE DRAWING(S)

Figure 2:
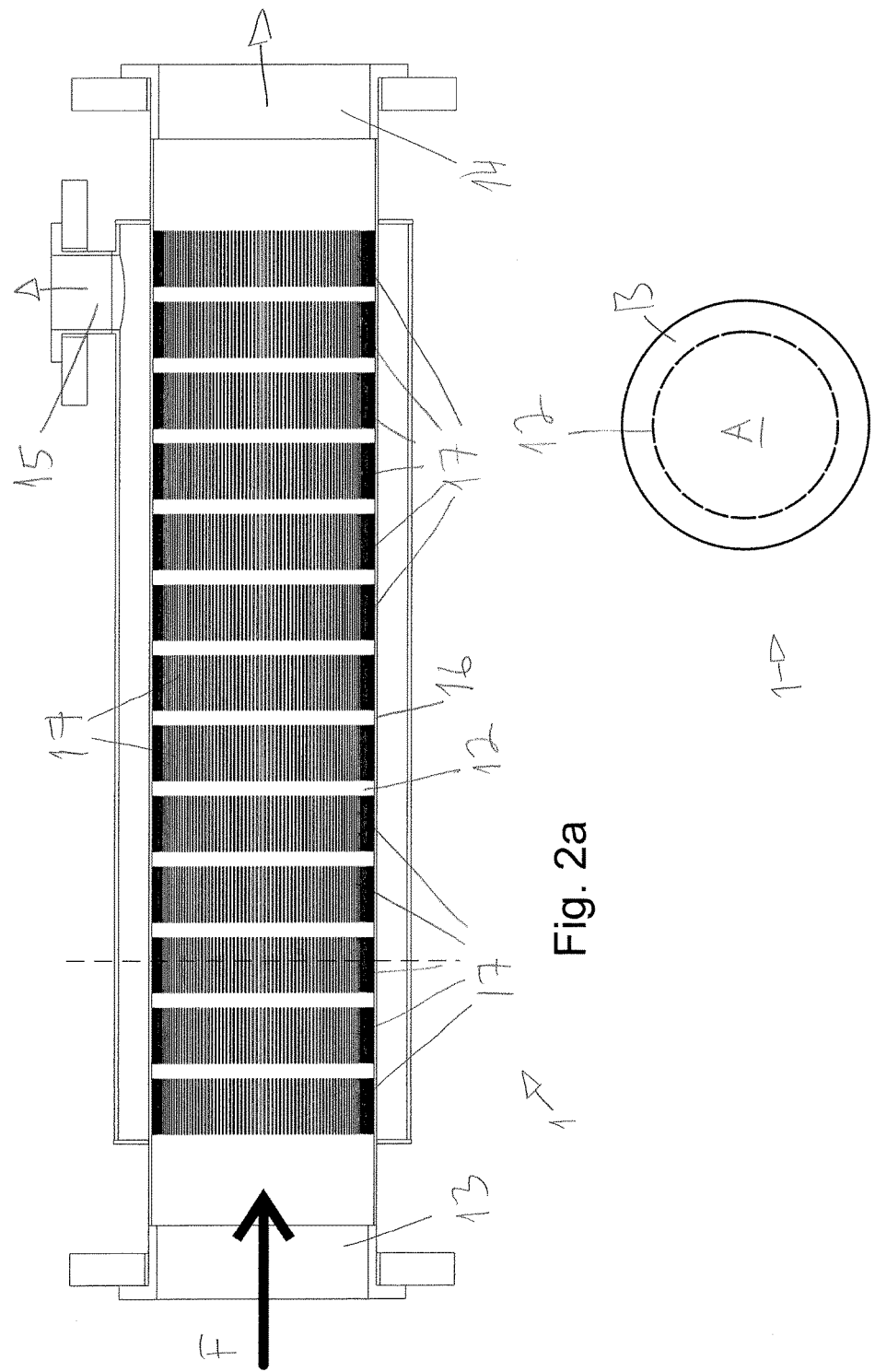
Figure 3:
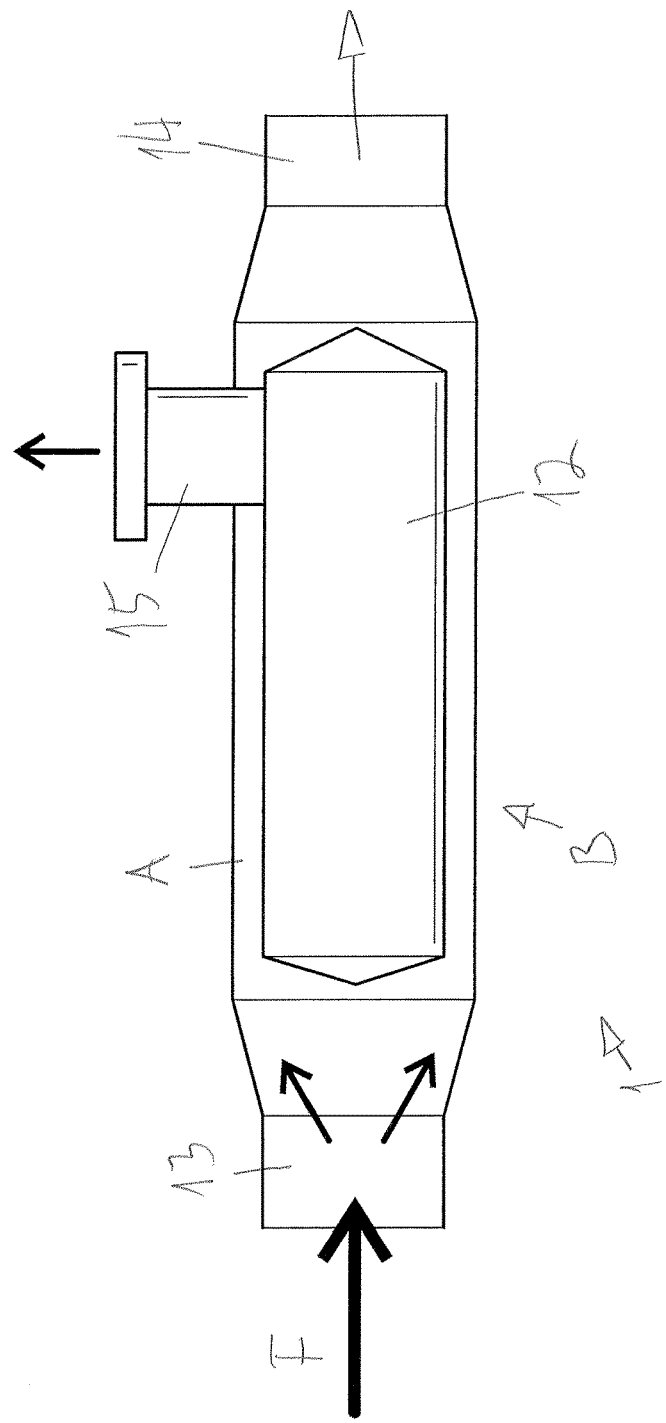
Figure 6B:
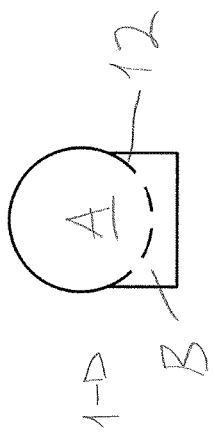
Figure 11:
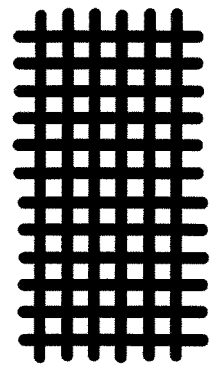
Figure 10:
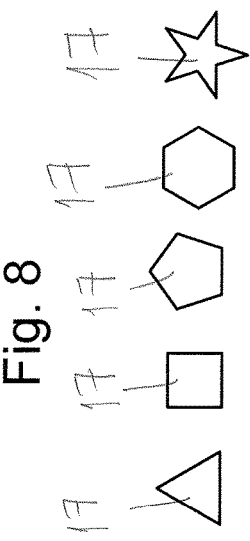
Figure 6A:
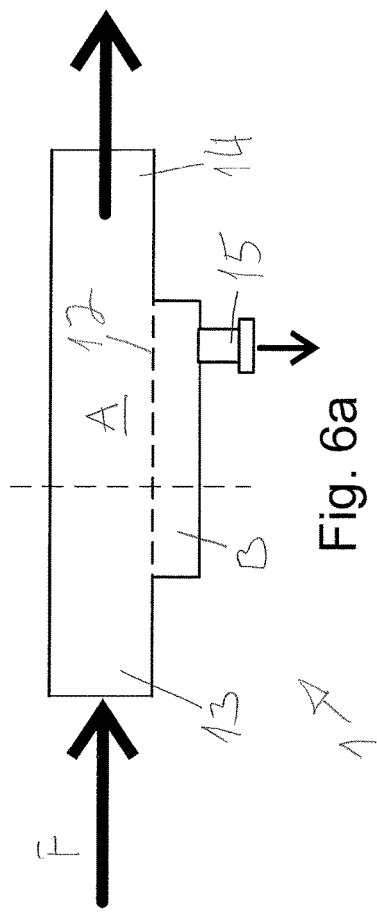
Figure 8:
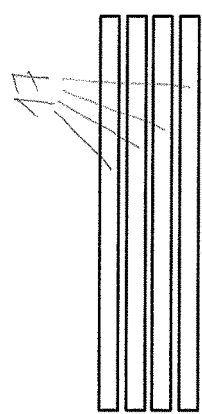
Figure 9:
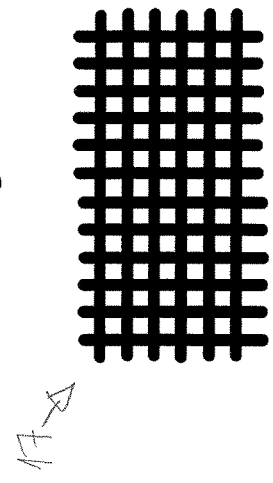
Figure 7:
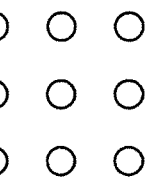
Figure 13:
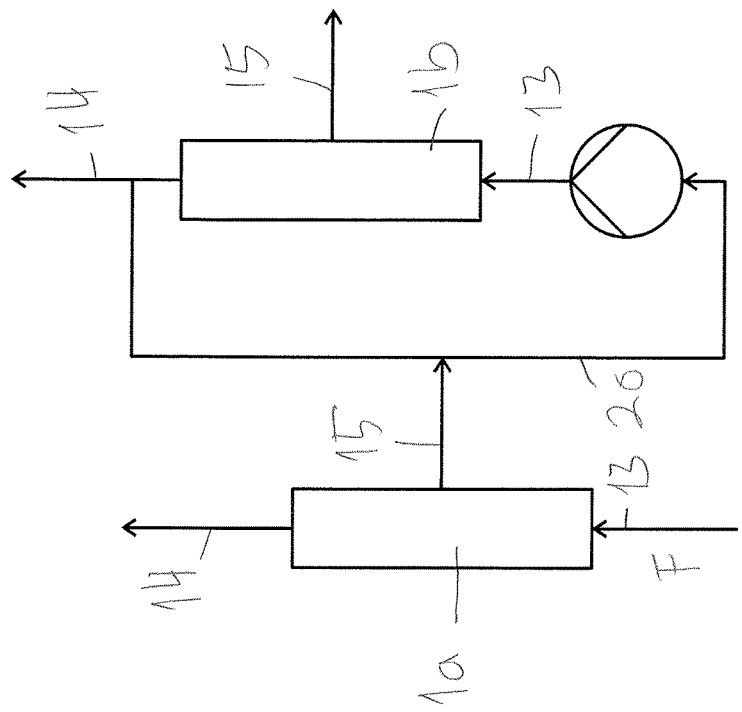
Figure 12:
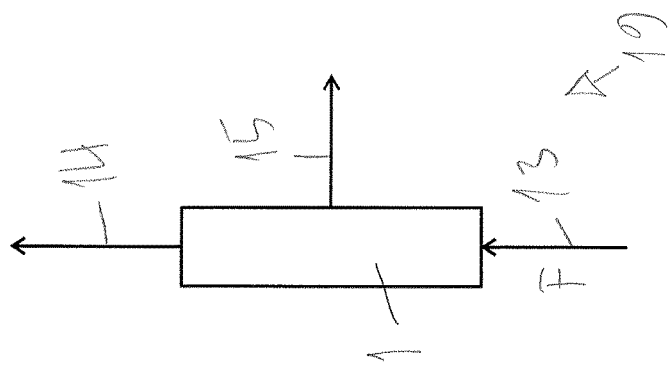

Some embodiments illustrating the present disclosure are described in more detail in the attached drawings, in which FIG. 1 is a schematic view of an example pyrolysis plant in partial cross-section, FIG. 2a is a schematic side view of a filter for filtering pyrolysis oil in partial cross-section, FIG. 2b is a schematic end view of the filter shown in FIG. 2a in partial cross-section, FIG. 3 is a schematic side view of another filter for filtering pyrolysis oil in partial cross-section, FIG. 4 is a schematic side view of third filter for filtering pyrolysis oil in partial cross-section, FIG. 5 is a schematic side view of fourth filter for filtering pyrolysis oil in partial cross-section, FIG. 6a is a schematic side view of fifth filter for filtering pyrolysis oil in partial cross-section, FIG. 6b is a schematic end view of the filter shown in FIG. 6a in partial cross-section, FIG. 7 is a schematic view of a detail of a filter for filtering pyrolysis oil, FIG. 8 is a schematic view of another detail of a filter for filtering pyrolysis oil, FIG. 9 is a schematic view of further details of filters for filtering pyrolysis oil, FIG. 10 is a schematic view of still further detail of a filter for filtering pyrolysis oil in cross-section, FIG. 11 is a schematic side view of a detail of a filter for filtering pyrolysis oil in cross-section, FIG. 12 is a schematic view of an arrangement for filtering pyrolysis oil, and FIG. 13 is a schematic view of another arrangement for filtering pyrolysis oil.

In the figures, some embodiments are shown simplified for the sake of clarity. Similar parts are marked with the same reference numbers in the figures.

DETAILED DESCRIPTION OF VARIOUS EMBODIMENTS

FIG. 1 is a schematic view of an example pyrolysis plant in partial cross-section.

The feedstock 2 may comprise biomass that may include any solid biomass, such as wood, wood chips, saw dust, firewood, forest residue, urban wood waste, by products and waste of the papermaking industry, lumber waste and peat.

The pyrolysis process takes place in the pyrolysis unit 4. The biomass will not burn in the pyrolysis process, but releases combustable gases that may be condensed into liquid form. The term "pyrolysis gases" refers to gases that are formed in pyrolysis and that will be condensated in the process to form pyrolysis oil.

In an embodiment, the pyrolysis process is carried out in connection with a fluidized bed boiler. It is to be noted, however, that the fluidized bed boiler is not a necessary feature of the pyrolysis process. Heat energy needed for pyrolyzing the biomass may be produced by other means, too.

In this process dried feedstock is fed to a boiler 6 comprising a fluidized bed of hot inert bed material e.g. sand. Inert fluidizing gas is used to fluidize the bed. The feedstock will mix with the bed material, pyrolyze and form pyrolysis gases that are conducted out from the reactor. The heat for the pyrolysis process can be provided for example arranging the pyrolysis unit 4 next to the fluidized bed boiler 6 and circulating the thus heated bed material to the pyrolysis unit 4. Thus the heat energy required for the pyrolysis may be brought to the pyrolysis unit 4 at least partly with the bed material of the fluidized bed boiler 6.

The fluidized bed boiler 6 may be used for generating steam that may be utilized, superheated or not, in a steam turbine 7 for producing electricity, or in any process known per se.

The pyrolysis gases are condensed in a condenser unit 5 in one or more steps for producing pyrolysis oil, which is further conducted out of the pyrolysis plant 100 via a discharge conduit 7. The embodiment of the condenser unit 5 shown in FIG. 1 comprises a scrubber 10 and a condenser 26.

The condenser unit 5 may be cooled by pyrolysis oil that is cooled in a heat exchanger unit (not shown) and circulated via a circulation conduit 11 back to the condenser unit 5.

The discharge conduit 7 is connected to the circulation conduit 11. The discharge conduit 7 is fed by the circulation conduit 11 an amount of pyrolysis oil that corresponds to amount of pyrolysis oil being condensing in the condenser unit 5. This way the volume of pyrolysis oil circulating in the circulation conduit 11 may be kept constant.

According to an idea, 1%-25%, preferably 1%-10%, typically about 5%, of the flow is fed in the discharge conduit 7, and the rest of the flow is circulated back to the condenser unit 5.

Gases that have not condensed in the condenser unit 5 are discharged via conduit 8 to be further processed, or may be fed in the fluidized bed boiler 6. The not condensed gas may also be returned via conduit 9 to the pyrolysis unit 4 and used as fluidizing gas therein.

In FIG. 1 there are shown some embodiments of filter sites for a filter and a filter arrangement described more detailed in FIGS. 2a-13 and description thereof. These filter sites are shown by dashed line circles H, J and K. It is to be noted that the filter sites H, J and K are not the only possible filter sites suitable for the filter and the filter arrangement. Furthermore, it is to be noted that the pyrolysis plant 100 or any pyrolysis oil plant or arrangement may comprise one or more said filter sites therein.

FIGS. 2a-2b are schematic views of a filter for filtering pyrolysis oil in partial cross-section. The filter is split-flow filter 1, the main components of which comprises a filter element 12, a receiving channel 13, a main discharge channel 14 and a filtrate channel 15.

The filter element 12 comprises at least one layer of material 16 and plurality of apertures 17 that extend through the layer of material 16, i.e. the filter element 12. The filter element 12 is a rigid element and implemented without moving parts or components.

The receiving channel 13 is for receiving a flow F of pyrolysis oil to be filtered and for supplying said flow F on first side A of the filter element 12. The receiving channel 13 may be aligned parallel with the first side A of the filter element.

The main discharge channel 14 is arranged on the first side A of the filter element, i.e. on the same side as the receiving channel 13. The main discharge channel 14 is arranged for discharging the portion of the flow F of pyrolysis oil that does not penetrate through the apertures 17 on a second side B of the filter element.

The main discharge channel 14 may be aligned parallel with the first side of the filter element.

The term "parallel" means in this description that angle α between the direction D of the receiving channel 13 or the main discharge channel 14 and the surface of the first side A is 0°-45°, preferably 0°-20°, more preferably 0°.

In another embodiment, the main discharge channel 14 is aligned orthogonal with the first side of the filter element. The term "orthogonal" means in this description that the angle α is in range of 46°-90°.

The filtrate channel 15 is situated on the second side B of the filter element for discharging the portion of the flow F of pyrolysis oil having penetrated through the apertures 17 of the filter element.

In an embodiment the filtrate channel 15 is aligned orthogonal with the second side of the filter element.

In the embodiment shown in FIGS. 2a-2b, the filter element 12 is cylinder-shaped, the first side A being arranged inside of the cylinder-shaped filter element 12. An advantage of the embodiment shown in FIGS. 2a-2b is that lighter components of the flow F or components having lower viscosity can easily reach the filter element 12 easily because said components tend to flow to the vicinity of a wall of a flowing channel, such as the receiving channel 13 due to the outward flow in the discharge channel 15.

The cross-section of the filter element 12 as well as the cross-section of the filter 1 is round.

In an embodiment the inner diameter and shape of the filter element 12 is equal to the inner diameter or cross-sectional area of the receiving channel 13 and also equal to the inner diameter or cross-sectional area of main discharge channel 14. Thus the filter element 12 should not cause any significant resistance or turbulence to flow of the pyrolysis oil, or a minimal pressure loss.

In another embodiment, the inner diameter or cross-sectional area of the filter element 12 is smaller than corresponding dimensions of the receiving channel 13. Thus the filter element 12 raises the flow velocity in the filter 1 which may have a positive effect on the filtering process, due to e.g. intensified flushing of the filter element 12.

In still another embodiment, the inner diameter or cross-sectional area of the filter element 12 is bigger than corresponding dimensions of the receiving channel 13. An advantage is that the filter element causes turbulences in the flow F, and/or lowers the flow velocity in the filter 1, which may have a positive effect on the filtering process. Said lowered flow velocity may lessen the risk of clogging of the filter element 12 by reducing the amount of particles finding their way in apertures of the filter element 12.

Manufacturing materials of the filter 1 may be selected from materials known per se, e.g. ferrous metals and composites.

FIG. 3 is a schematic side view of a filter for filtering pyrolysis oil in partial cross-section.

In an embodiment the filter element 12 is cylinder-shaped as in the embodiment shown in FIGS. 2a-2b, but now the first side A is arranged outside the cylinder-shaped filter element 12 and the second side B inside the filter element 12.

Thus the receiving channel 13 is arranged to supply flow F on outside of the filter element 12. The receiving channel 13 may be aligned parallel with the first side A of the filter element.

Also the main discharge channel 14 is arranged on outside of the filter element 12 for discharging the portion of the flow F of pyrolysis oil that does not penetrate through the apertures 17 on a second side B of the filter element.

An advantage of the embodiment shown in FIG. 3 is that turbulences may be created in the flow F and/or flow rate may be accelerated.

In an embodiment, the receiving channel 13 is aligned orthogonal and the main discharge channel 14 parallel and the filter element 12 on the first side A as well as the inner shape of the filter are shaped as in a cyclone separator. An advantage of this embodiment is that flow F comprising lot of solid matter, e.g. sand, may be filtered effectively.

FIG. 4 and FIG. 5 are schematic side views of third and fourth filter for filtering pyrolysis oil in partial cross-section. In an embodiment the filter element 12 is cone-shaped. The first side A of the filter element 12 may be arranged outside (as shown in FIG. 4), or alternatively, inside (as shown in FIG. 5) of the cone-shaped filter element 12.

An advantage of the cone-shaped filter element 12 is that flow rate may be accelerated and e.g. a reliably working flow meter can be implemented easily in the structure.

FIGS. 6a-b are schematic side views of a fifth filter for filtering pyrolysis oil in partial cross-section.

In an embodiment the filter element 12 is planar-shaped. The term "planar-shaped" means here not only plane surfaces but also all basically two-dimensional surfaces that may comprise straight and/or curved cross-sections. The embodiment of the filter 1 shown in Figures 6a-6b has a filter element 12 that is completely planar, i.e. all cross-sections therein are straight.

FIG. 7 is a schematic view of a detail of a filter for filtering pyrolysis oil. In an embodiment the filter element 12 comprises apertures 17 that are round. The round apertures can be used in any type of filter element 12 described in this description.

The diameter of the round aperture may be e.g. in range of 0.5 mm-10 mm, preferably 1 mm-8 mm depending on the targeted filtering effect. Also the amount of the apertures 17 per surface area of the filter element 12 is selected depending on the targeted filtering effect.

The apertures can be made methods known per se, e.g. by die-cutting, drilling, punching etc.

An advantage of the round apertures is that they are easily manufactured by various methods. Furthermore, round aperture effectively prevents clift-like particles to go through.

FIG. 8 is a schematic side view of another detail of a filter for filtering pyrolysis oil. In an embodiment the filter element 12 comprises apertures 17 that are elongated. The elongated aperture may be e.g. a slit having two long and parallel sides and two shorter sides connecting the long sides. According to an idea, the length of the long side is several multiples of the length of the short side. The length of the short side may be e.g. in range of 1 mm-10 mm.

In an embodiment the elongated aperture 17 has a shape of rectangle as show in FIG. 8. In another embodiment, the first long side has different length compared to the second long side, and/or the first short side has different length compared to the second short side. Furthermore, the short side may be straight as in FIG. 8, or alternatively, it may be curved. In still another embodiment, the elongated aperture 17 may comprise curved sides. An example of this embodiment is oval-shaped aperture, and another example curved-shaped aperture.

An advantage of the elongated apertures is that gel-like substances having quite large dimensions may penetrate/glide through the aperture whereas solid particles being larger than the short side do not penetrate the aperture. It is to be noted here, that the term "gel-like" means in this description a dispersed phase of liquid matter having higher viscosity than the surrounding continuous phase. An example of the gel-like material is lignin.

The alignment of the elongated aperture 17 in the filter element 12 may be selected depending e.g. on the design of the filter and the filter element. In an embodiment, the long side is arranged parallel with the longitudinal axis X of the filter. In another embodiment, the long side is arranged perpendicular to said axis X. In third embodiment, the long side is arranged in an angle between parallel and perpendicular directions in relation to said axis X. The alignment of the elongated aperture 17 contributes to turbulences taking place on the surface of the filter element 12.

FIG. 9 shows schematic views of other embodiments of a filter for filtering pyrolysis oil. In an embodiment the filter element 12 comprises apertures 17 that are polygonal in their shape. The polygonal shape may be e.g. triangle, square, pentagon, hexagon etc. Alternatively, the aperture 17 may have a star-like shape.

An advantage of the polygonal apertures is that it is not completely blocked in case a round particle is jammed in the aperture.

FIG. 10 shows schematic view of another embodiment of a filter for filtering pyrolysis oil. According to an idea, the structure of the filter element 12 is like sieve or screen.

An advantage is that a filter element having lot of apertures may be easily manufactured.

FIG. 11 is a schematic side view of another detail of a filter for filtering pyrolysis oil. In an embodiment the filter element 12 comprises apertures 17 having raised edges 18 that are extending from the filter element towards the first side A of the filter element. The raised edges 18 generate turbulences in the flow F which may enhance the filtering process. Furthermore, said turbulence may prevent the aperture 17 to be blocked by particles or other impurities.

The raised edges 18 may be formed when the aperture 17 is manufactured e.g. by die-cutting, drilling, punching etc.

According to an idea, the raised edge 18 does not surround the aperture all around the aperture but there may be some not-raised sections between raised sections on the edge or side of the aperture 17.

FIG. 12 is a schematic view of an arrangement for filtering pyrolysis oil. The filtering arrangement 19 may be adapted to a circulation conduit 11 that is connected to a condenser 5 unit for cooling pyrolysis gas therein as described in the description earlier in this description. Reference symbols H and K in FIG. 1 shows a site for arranging the filter 1 in the circulation conduit 11.

A receiving channel 13 and a main discharge channel 14 are connected to the circulation conduit 11 so that flow F of pyrolysis oil flows from the receiving channel 13 to the main discharge channel 14.

At the filter site H, a filtrate channel 15 is connected to a discharge conduit 7 that is adapted to conduct filtrate, i.e. filtered pyrolysis oil out of the pyrolysis plant 100. In an embodiment, the discharge conduit 7 is arranged to conduit the filtered pyrolysis oil to a storage tank area 21 where it is stored until sent out from the pyrolysis plant to e.g. a customer.

As described earlier, the filtrate channel 15 is arranged to discharge a secondary flow that is in range of 1%-10%, typically about 5% of the flow F of pyrolysis oil received by the receiving channel 13.

The filtering arrangement 19 shown in FIG. 12 may also be arranged in other sites of the pyrolysis plant 100, too. In an embodiment, the filtering arrangement 19 is adapted to an outlet conduit 22, i.e. to the filter site J shown in FIG. 1. The outlet conduit 22 is used for transferring pyrolysis oil out form the plant 100 to transporting means 23. The transporting means 23 may be a tank truck, tank wagon etc. In this embodiment, pyrolysis oil flows through the filtrate channel 15 to the transporting means 23. The main discharge channel 14 discharges rest of the pyrolysis oil back to the pyrolysis plant 100 and production process thereof In still another embodiment, the filtering arrangement 19 may be arranged to the circulation conduit 11 at filter site K so that the main discharge channel 14 is arranged to feed a main fraction of the pyrolysis oil to first nozzles 27 of the condenser 26, whereas the filtrate channel 15 is connected to second nozzles 28 of the condenser 26. An advantage is that the nozzles may be optimized for a certain fraction of pyrolysis oil.

FIG. 13 is a schematic view of another arrangement for filtering pyrolysis oil. According to an idea, the filtering arrangement 19 comprises at least two filters arranged in parallel in respect of the main flow F such that the filtrate channel 15 of a first filter 1a is connected to the receiving channel 13 of a second filter 1b.

The filter element of the first filter 1a is adapted to allow larger particles to penetrate into filtrate than the filter element of the second filter 1b.

In an embodiment, the filter element of the first filter 1a allows particles of 3 mm or less in diameter to flow into the receiving channel 13 of a second filter 1b. The filter element of the second filter 1b has smaller apertures and allows particles of 1 mm or less in diameter to flow through the filter element into the filtrate channel 15 of the second filter 1b. Thus in the main discharge channel 14 of the second filter 1b there is exiting a fraction of pyrolysis oil comprising particles the diameter of which is in range 1 mm-3 mm.

In another embodiment, there are more than two filters connected parallel using the principle of connections as shown in FIG. 13. Thus one can get two or even more fractions of pyrolysis oil out the arrangement.

This kind fractioned pyrolysis oil may be utilized e.g. in filtering processes for removal of solid matter and/or highly viscose phases from the pyrolysis process. Because of fairly narrow particle size distribution in each flow of the fractioned pyrolysis oil, it is possible to separate pyrolysis oil fractions for special end use, e.g. in small-sized oil burners.

In an embodiment, the filtering arrangement 19 that comprises at least two filters arranged in parallel includes a return channel 20 connecting the main discharge channel 14 of the second filter 1b to the receiving channel 13 of said second filter 1b for leading a part of flow in the main discharge channel 14 as a return flow back to said second filter 1b. The filtrate channel 15 of the first filter 1a is connected to said return channel 20. The purpose of the return channel 20 may be e.g. maintaining sufficient high volume flow in the second filter 1b. However, the sufficient high volume flow may be maintained by dimensioning the filters 1a, 1b suitably.

According to another idea, the filtering arrangement 19 comprises at least two filters arranged in series in respect of the main flow F.

This way it is possible to separate filtrates having different fractions of components.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims. For instance, there can be differently shaped apertures 17 in the very same filter element 12.

REFERENCE SYMBOLS 1, 1a, 1b split-flow filter
2 feedstock
3 solids return
4 pyrolysis unit
5 condenser unit
6 fluidized bed boiler
7 discharge conduit for pyrolysis oil
8 conduit for non-condensable gas
9 conduit for returning non-condensable gas
10 scrubber
11 circulation conduit
12 filter element
13 receiving channel
14 main discharge channel
15 filtrate channel
16 layer of material
17 aperture
18 raised edge
19 filtering arrangement
20 return channel
21 storage tank area
22 outlet conduit
23 transporting means
24 flue gases
25 bed material return
26 condenser
100 pyrolysis plant
A first side (of the filter element)
B second side (of the filter element)
D direction (of the receiving channel)
F flow
H filter site
J filter site
X longitudinal axis
α angle

The invention claimed is:
1. A filtering arrangement for filtering pyrolysis oil, the filter arrangement comprising:
at least two filters each comprising:
a filter element comprising a plurality of apertures extending through the filter element;

a receiving channel positioned to receive a flow of pyrolysis oil to be filtered and to supply said flow to a first side of the filter element;
a main discharge channel positioned on the first side of the filter element and positioned to discharge the portion of the flow of pyrolysis oil having not penetrated through the filter element; and
a filtrate channel arranged on a second side of the filter element for discharging the portion of the flow of pyrolysis oil having penetrated through the filter element;
a circulation conduit connected to a condenser unit for cooling pyrolysis gas; and a return channel,
wherein:
the filtrate channel of a first of the at least two filters is connected to the receiving channel of a second of the at least two filters;
the return channel is positioned to connect the main discharge channel of the second filter to the receiving channel of the second filter, for feeding a return flow to said second filter;
the filtrate channel of the first filter is connected to said return channel; and
the receiving channel and the main discharge channel of the second filter are connected to the circulation conduit.

2. The filtering arrangement as claimed in claim 1, wherein:
the filter element is cylinder-shaped, and
the first side is arranged outside of the cylinder-shaped filter element.

3. The filtering arrangement as claimed in claim 1, wherein:
the filter element is cylinder-shaped, and
the first side is arranged inside of the cylinder-shaped filter element.

4. The filtering arrangement as claimed in claim 3, wherein the first side is arranged inside of the cylinder-shaped filter element, the inner diameter of the filter element being equal to the inner diameter of the receiving channel.

5. The filtering arrangement as claimed in claim 1, wherein the filter element is planar-shaped.

6. The filtering arrangement as claimed in claim 1, wherein the filter element is cone-shaped.

7. The filtering arrangement as claimed in claim 6, wherein the first side is arranged outside of the cone-shaped filter element.

8. The filtering arrangement as claimed in claim 6, wherein the first side is arranged inside of the cone-shaped filter element.

9. The filtering arrangement as claimed in claim 1, wherein the plurality of apertures are round apertures.

10. The filtering arrangement as claimed in claim 1, wherein the plurality of apertures are elongated apertures.

11. The filtering arrangement as claimed in claim 1, wherein the plurality of apertures comprise a slit-shaped aperture having two long and parallel sides.

12. The filtering arrangement as claimed in claim 1, wherein the plurality of apertures are polygonal apertures.

13. The filtering arrangement as claimed in claim 1, wherein the plurality of apertures comprise apertures having edges raised from the filter element towards the first side of the filter element.

14. The filtering arrangement as claimed in claim 1, wherein the filtrate channel is arranged to discharge a secondary flow that is in range of 1%-25% of the flow of pyrolysis oil received by the receiving channel.

15. The filtering arrangement as claimed in claim 1, wherein the filter element of the first filter is arranged to transmit larger particles than the filter element of the second filter.

16. A filtering arrangement for filtering pyrolysis oil, the filter arrangement comprising:
at least two filters each comprising:
a filter element comprising a plurality of apertures extending through the filter element;
a receiving channel positioned to receive a flow of pyrolysis oil to be filtered and to supply said flow to a first side of the filter element;
a main discharge channel positioned on the first side of the filter element and positioned to discharge the portion of the flow of pyrolysis oil having not penetrated through the filter element; and
a filtrate channel arranged on a second side of the filter element for discharging the portion of the flow of pyrolysis oil having penetrated through the filter element;
an outlet conduit positioned for transferring pyrolysis oil from a pyrolysis plant to transporting means; and
a return channel,
wherein:
the filtrate channel of a first of the at least two filters is connected to the receiving channel of a second of the at least two filters;
the return channel is positioned to connect the main discharge channel of the second filter to the receiving channel of the second filter, for feeding a return flow to said second filter;
the filtrate channel of the first filter is connected to said return channel; and the filtrate channel of the second filter is connected to the outlet conduit.

17. The filtering arrangement as claimed in claim 16, wherein:
the filter element is cylinder-shaped, and
the first side is arranged outside of the cylinder-shaped filter element.

18. The filtering arrangement as claimed in claim 16, wherein:
the filter element is cylinder-shaped, and
the first side is arranged inside of the cylinder-shaped filter element.

19. The filtering arrangement as claimed in claim 18, wherein the first side is arranged inside of the cylinder-shaped filter element, the inner diameter of the filter element being equal to the inner diameter of the receiving channel.

20. The filtering arrangement as claimed in claim 16, wherein the filter element is planar-shaped.

21. The filtering arrangement as claimed in claim 16, wherein the filter element is cone-shaped.

22. The filtering arrangement as claimed in claim 21, wherein the first side is arranged outside of the cone-shaped filter element.

23. The filtering arrangement as claimed in claim 21, wherein the first side is arranged inside of the cone-shaped filter element.

24. The filtering arrangement as claimed in claim 16, wherein the plurality of apertures are round apertures.

25. The filtering arrangement as claimed in claim 16, wherein the plurality of apertures are elongated apertures.

26. The filtering arrangement as claimed in claim 16, wherein the plurality of apertures comprise a slit-shaped aperture having two long and parallel sides.

27. The filtering arrangement as claimed in claim 16, wherein the plurality of apertures are polygonal apertures.

28. The filtering arrangement as claimed in claim 16, wherein the plurality of apertures comprise apertures having edges raised from the filter element towards the first side of the filter element.

29. The filtering arrangement as claimed in claim 16, wherein the filtrate channel is arranged to discharge a secondary flow that is in range of 1%-25% of the flow of pyrolysis oil received by the receiving channel.

30. The filtering arrangement as claimed in claim 16, wherein the filter element of the first filter is arranged to transmit larger particles than the filter element of the second filter.

\* \* \* \* \*